(12) United States Patent
Nabetani

(10) Patent No.: US 10,917,541 B2
(45) Date of Patent: Feb. 9, 2021

(54) IMAGE FORMING APPARATUS, IMAGE COLOR CHANGE METHOD, AND STORAGE MEDIUM STORING IMAGE COLOR CHANGE PROGRAM

(71) Applicant: SHARP KABUSHIKI KAISHA, Sakai (JP)

(72) Inventor: Hiromasa Nabetani, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/541,520

(22) Filed: Aug. 15, 2019

(65) Prior Publication Data

US 2020/0068095 A1 Feb. 27, 2020

(30) Foreign Application Priority Data

Aug. 22, 2018 (JP) ................................ 2018-155403

(51) Int. Cl.
*H04N 1/62* (2006.01)
*H04N 1/60* (2006.01)
*H04N 1/32* (2006.01)
*H04N 1/00* (2006.01)

(52) U.S. Cl.
CPC ............. *H04N 1/60* (2013.01); *H04N 1/0044* (2013.01); *H04N 1/00506* (2013.01); *H04N 1/32309* (2013.01)

(58) Field of Classification Search
CPC ............... H04N 1/60; H04N 1/0044
USPC ................................... 358/518, 538
See application file for complete search history.

(56) References Cited

U.S. PATENT DOCUMENTS

| 5,726,781 A * | 3/1998 | Isemura ............. H04N 1/40012 358/500 |
| 6,453,079 B1 * | 9/2002 | McInerny ............... G06K 9/033 382/311 |
| 2005/0264850 A1 * | 12/2005 | Kim .......................... H04N 1/46 358/2.1 |
| 2011/0128562 A1 * | 6/2011 | Anazawa ............ G06F 3/04847 358/1.9 |
| 2011/0310446 A1 | 12/2011 | Komatsu |
| 2013/0342860 A1 * | 12/2013 | Ono .......................... G06F 3/12 358/1.9 |

FOREIGN PATENT DOCUMENTS

JP 2012-029276 A 2/2012

\* cited by examiner

*Primary Examiner* — Jamares Q Washington
(74) *Attorney, Agent, or Firm* — ScienBiziP, P.C.

(57) ABSTRACT

An original reading unit that inputs image data; an image generation unit that generates an image based on the image data; an image output unit that outputs, as a preview image, the image generated based on the image data; a touch panel display that displays the preview image; a color change region specifying unit that specifies, in the preview image, a region, a color of which is changed; and a control unit that performs control so that color change of the region specified by the color change region specifying unit is performed are included.

9 Claims, 18 Drawing Sheets

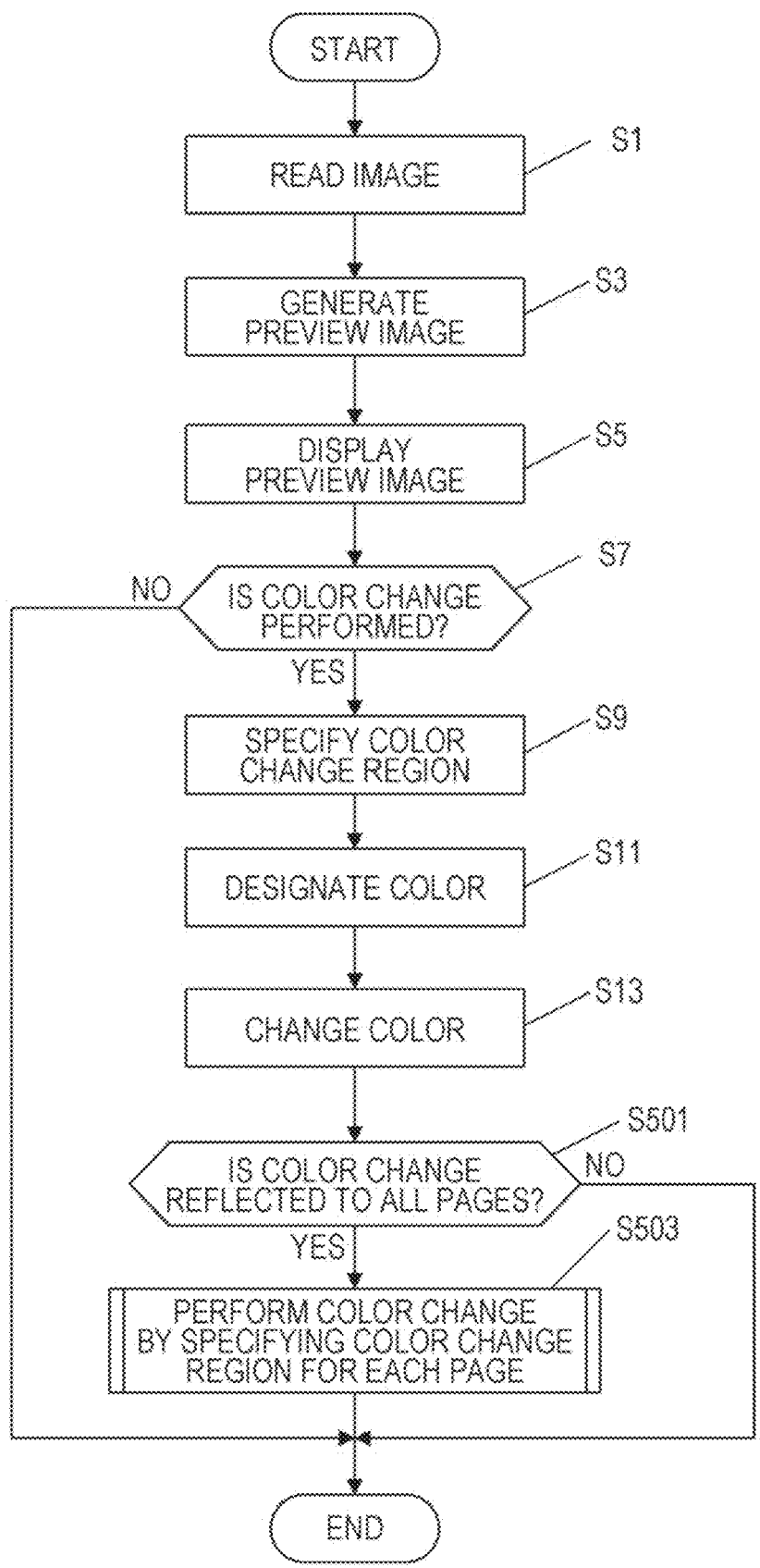

IMAGE FORMING APPARATUS, IMAGE COLOR CHANGE METHOD, AND STORAGE MEDIUM STORING IMAGE COLOR CHANGE PROGRAM

BACKGROUND

1. Field

The present disclosure relates to an image forming apparatus and the like.

2. Description of the Related Art

In recent years, an image forming apparatus capable of preview display of an original image has been known.

With such an image forming apparatus, by performing preview display of a processing result, which is obtained by scanning (pre-scanning) an original in advance before a job is executed, on a display screen, it is possible to check the read original before an output.

Moreover, in a case where an image to be output is adjusted or output setting is changed, by visually checking an image subjected to preview display on the display screen in the image forming apparatus, it is possible to recognize a finish of the image before printing.

As a related art, for example, a technique in which, in an image forming apparatus, an operation display unit is caused to perform preview display of image data generated by a scanner, a color-region input unit inputs a color region to subject to color matching in the image data, an object-color calculating unit calculates an object color to which a color of the color region is matched, a color-adjustment-condition setting unit sets a plurality of color adjustment conditions on which an output of the object color under an image output condition is within an allowable color difference, a color-conversion-condition changing unit selects, from a plurality of color adjustment conditions, a color adjustment condition on which a color difference occurring in an entire color space is smallest, and changes a color conversion condition, and a color conversion unit performs color conversion of the image data based on the changed color conversion condition is disclosed (refer to Japanese Unexamined Patent Application Publication No. 2012-29276).

The above-described image forming apparatus enables color adjustment including setting of an image output mode suitable for a state of the actual apparatus and a user request for an image output and setting of an optimum calibration condition without repeatedly outputting an image on a recording sheet actually, by recognizing a finished image, which is variable, through a preview image.

In the technique described in Japanese Unexamined Patent Application Publication No. 2012-29276, a color region selected in an image is subjected to color matching and a result of color adjustment is subjected to preview display, but a color in a UI (user interface) of the image forming apparatus is not to be changed to a color desired by a user.

The disclosure is made in view of the aforementioned conventional problem, and provides an image forming apparatus that has an excellent user interface and that is capable of easily changing, in the image forming apparatus, a color of a region specified in a state where an image based on image data is subjected to preview display to a color, which is desired by a user.

SUMMARY

The disclosure provides an image forming apparatus including: an input unit (original reading unit) that inputs image data; an image generation unit that generates an image based on the image data; an image output unit that outputs, as a preview image, the image generated based on the image data; a display unit that displays the preview image; a color change region specifying unit that specifies, in the preview image, a region, a color of which is changed; and a control unit that performs control so that color change of the region specified by the color change region specifying unit is performed.

Moreover, the disclosure provides an image color change method including: inputting image data; generating an image based on the image data; outputting, as a preview image, the image generated based on the image data; displaying the preview image; specifying, in the preview image, a region, a color of which is changed; and performing control so that color change of the region specified at the specifying is performed.

Moreover, the disclosure provides a storage medium storing an image color change program that causes a computer to execute: inputting image data; generating an image based on the image data; outputting, as a preview image, the image generated based on the image data; displaying the preview image; specifying, in the preview image, a region, a color of which is changed; and performing control so that color change of the region specified at the specifying is performed.

BRIEF DESCRIPTION OF THE DRAWINGS

FIG. 18 is a flowchart illustrating a process of color change processing in an image forming apparatus according to a fifth embodiment, in which color change is performed for an image which is input.

DESCRIPTION OF THE EMBODIMENTS

First Embodiment

An embodiment of the disclosure will be described below with reference to drawings.

Figure 1:
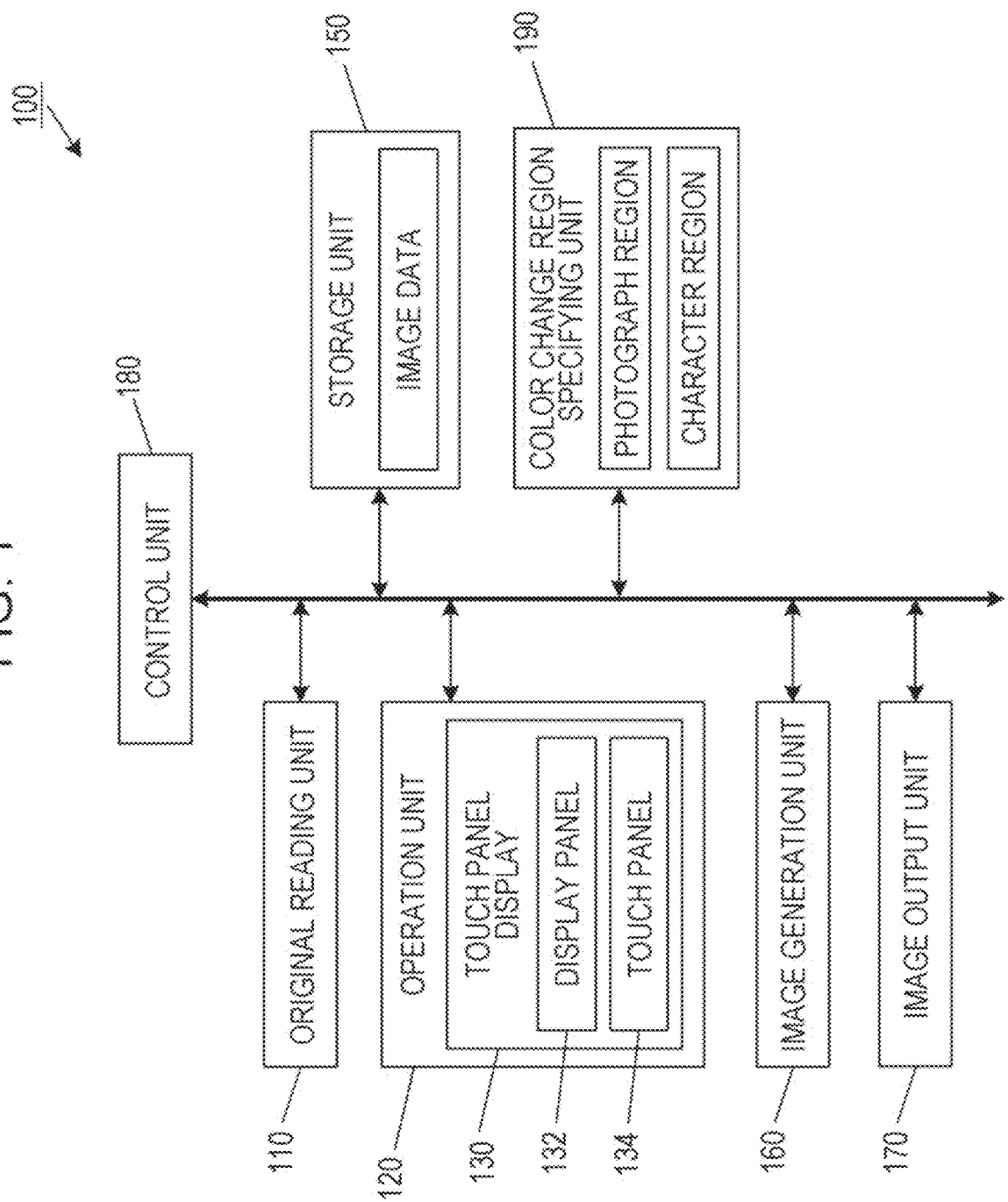
FIG. 1 is a block diagram illustrating a configuration of a major part of an image forming apparatus according to a first embodiment.
Figure 2:
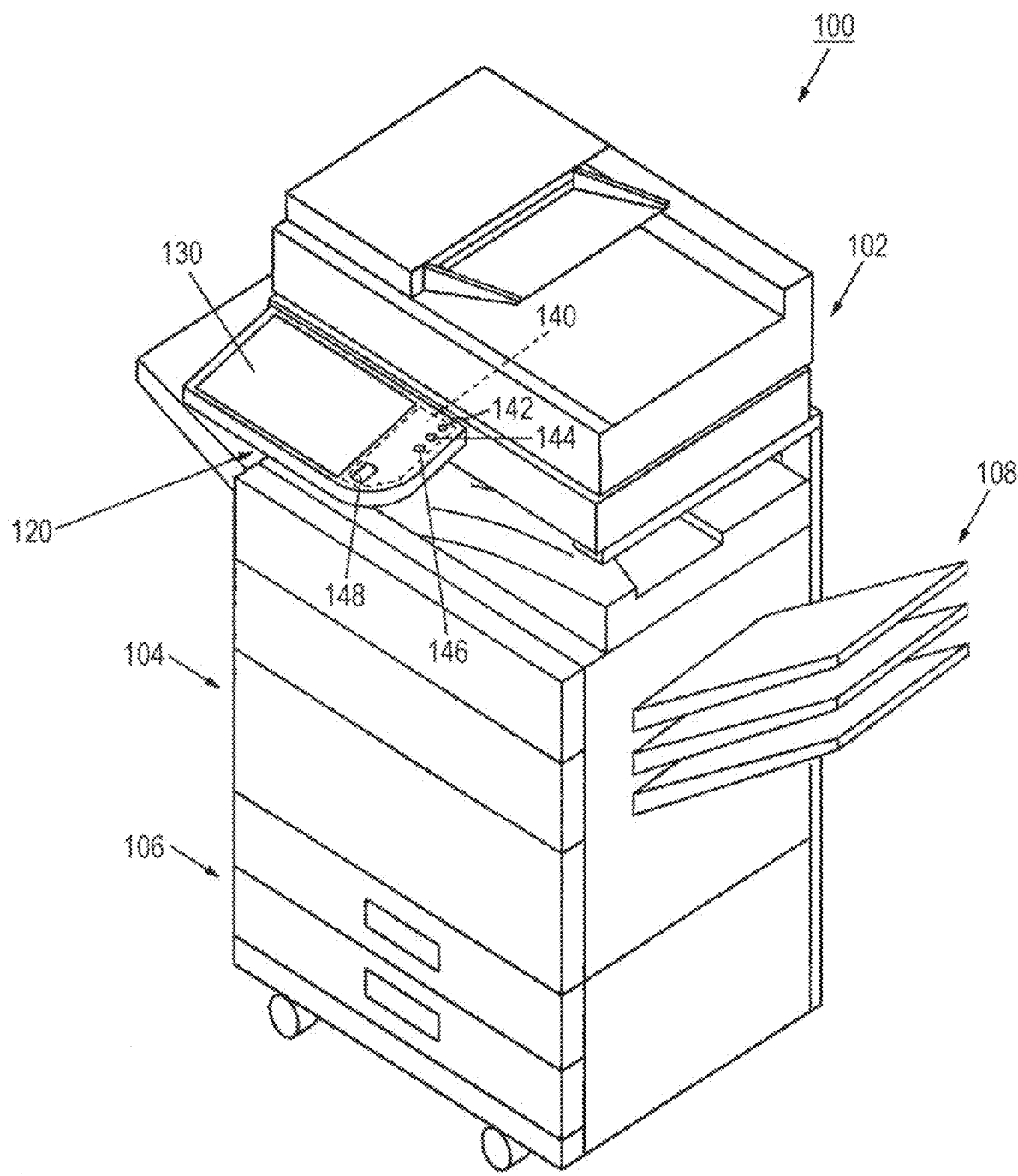
FIG. 2 is an explanatory view illustrating an entire configuration of the image forming apparatus.
Figure 3:
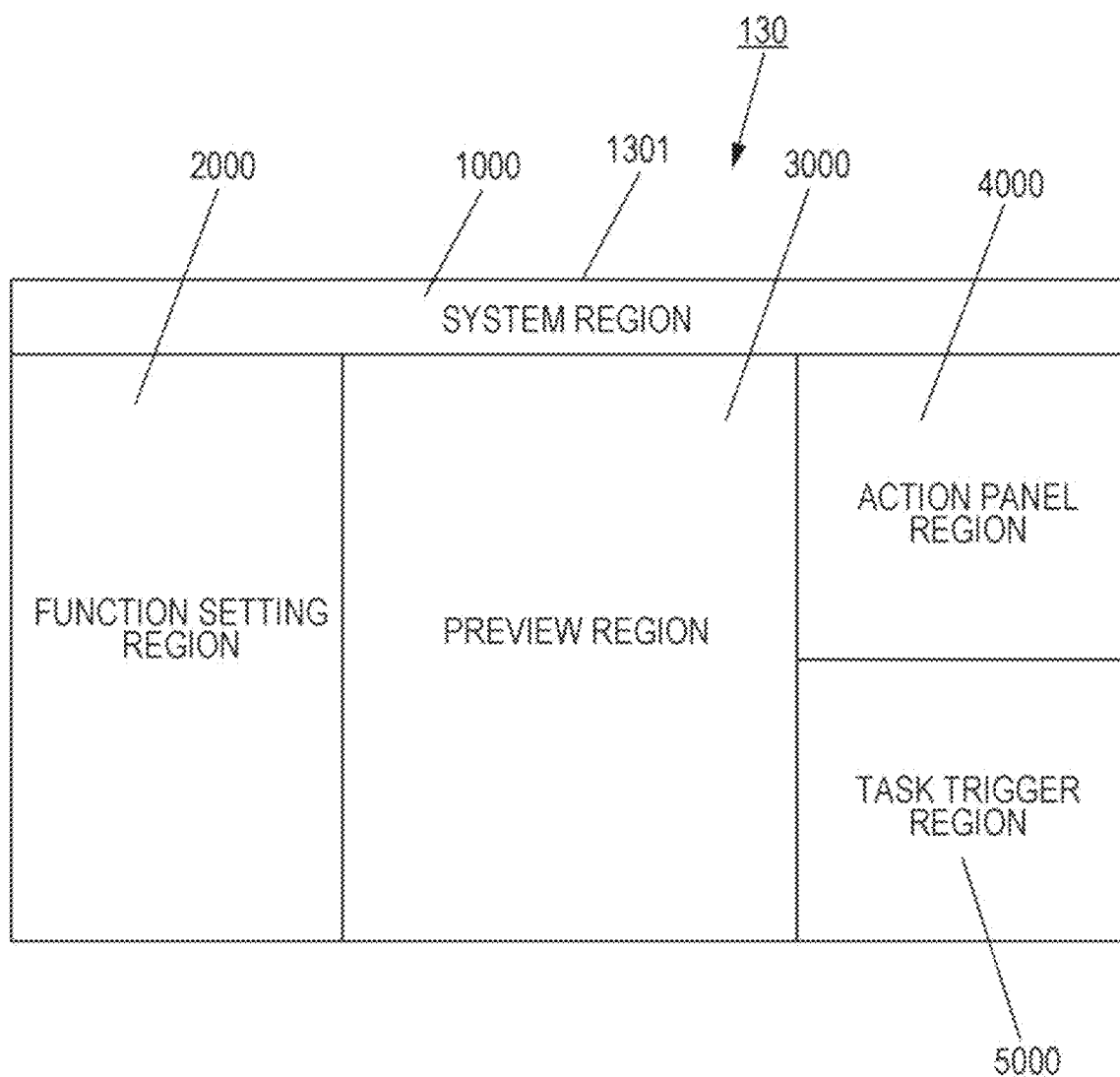
FIG. 3 is an explanatory view illustrating a preview display region of an operation screen that is displayed on a touch panel display of the image forming apparatus.
Figure 4:
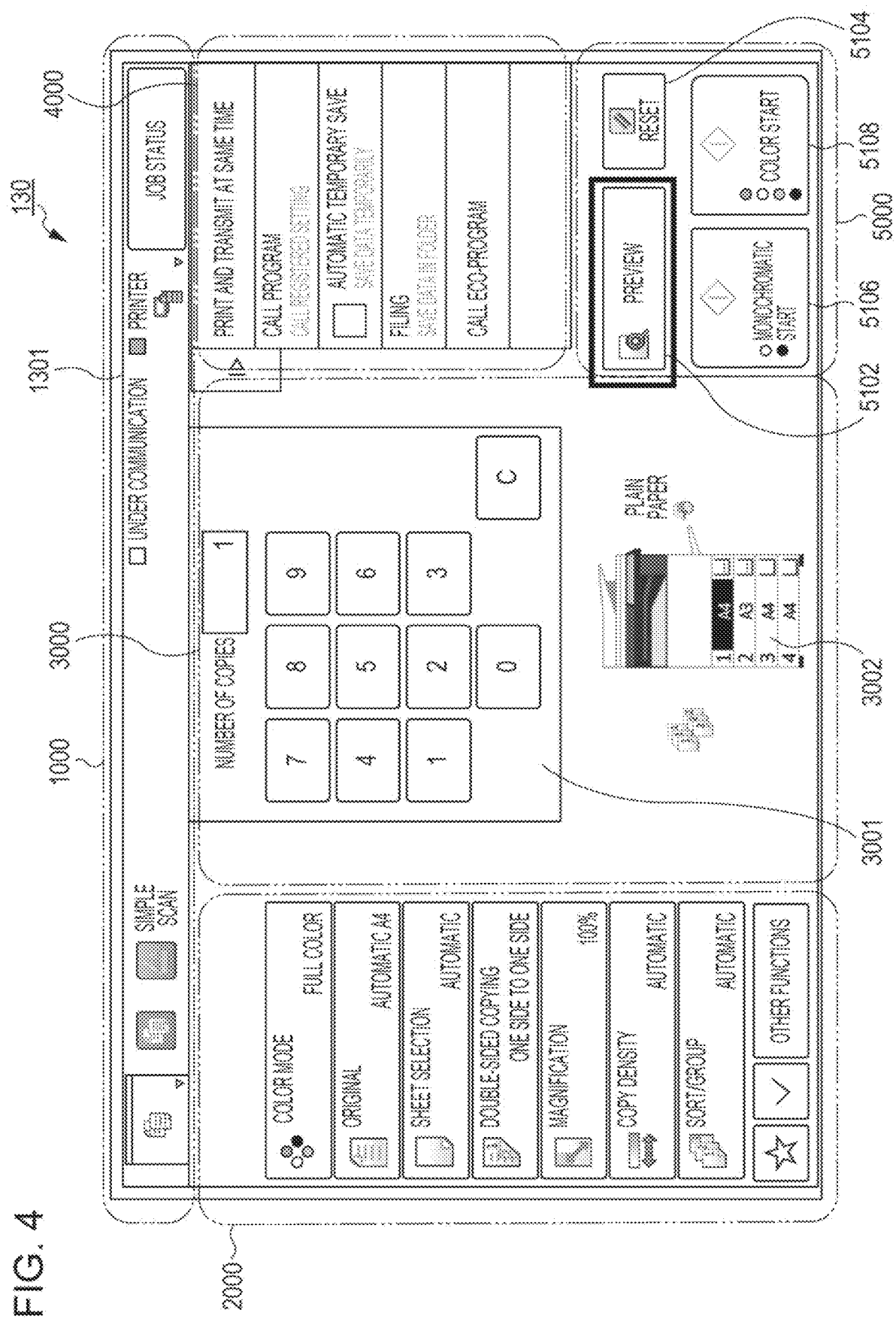
FIG. 4 is an explanatory view illustrating an example of the operation screen that is displayed on the touch panel display.
Figure 5:
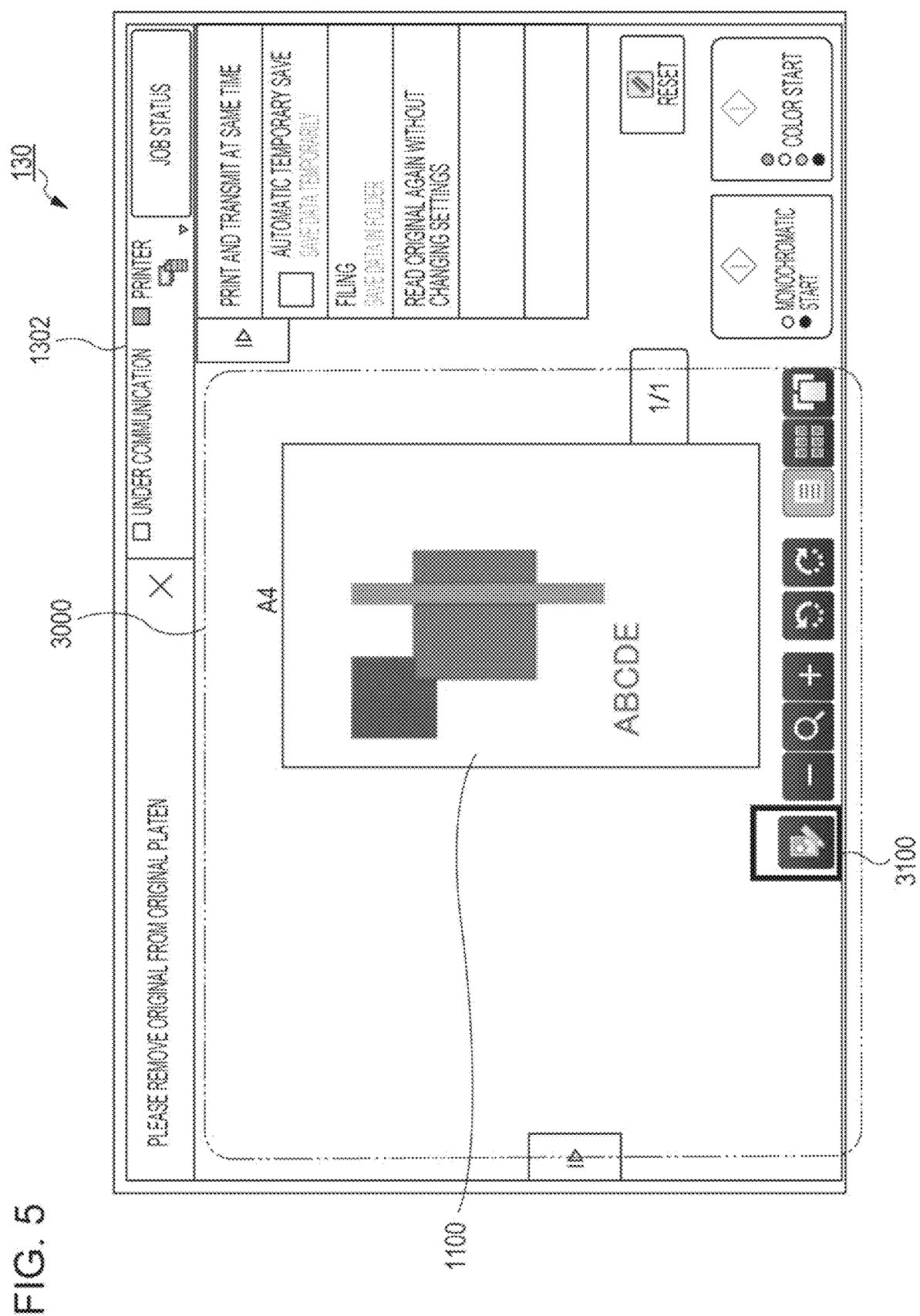
FIG. 5 is an explanatory view illustrating an example of a color change operation screen when color change processing is performed.

FIG. 1 is a block diagram illustrating a configuration of a major part of an image forming apparatus according to a first embodiment, FIG. 2 is an explanatory view illustrating an entire configuration of the image forming apparatus, FIG. 3 is an explanatory view illustrating a preview display region of a touch panel display of the image forming apparatus, FIG. 4 is an explanatory view illustrating an example of an operation screen that is displayed on the touch panel display, and FIG. 5 is an explanatory view illustrating an example of a color change operation screen when color change processing is performed.

The first embodiment is characterized in that, as illustrated in FIG. 1, an original reading unit (input unit) 110 that inputs image data, a storage unit 150, an image generation unit 160 that generates an image based on the image data, an image output unit 170 that outputs, as a preview image, the image generated based on the image data, an operation unit 120 that includes a touch panel display (display unit) 130 which displays the preview image, and a control unit 180 that controls an processing operation of each unit of an image forming apparatus 100 are included as components of the image forming apparatus 100 and color change of a region specified in the preview image displayed on the touch panel display 130 is performed.

(Configuration of Image Forming Apparatus)

Here, a basic configuration of the image forming apparatus 100 according to the first embodiment will be described.

The image forming apparatus 100 according to the first embodiment is an image forming apparatus as a type of image processing apparatus. The configuration according to the disclosure may be applied to an image processing apparatus or electronic equipment other than such an image forming apparatus.

The image forming apparatus 100 forms an image on a recording medium by an electrophotographic system.

Moreover, as operation modes, the image forming apparatus 100 has a copy mode, a facsimile mode (FAX mode), a document filing mode (mode by which an image obtained by scanning is stored in a storage device in the image forming apparatus), and a mail mode (mode by which an image obtained by scanning is transmitted in a form of attachment to an electronic mail). Note that, the image forming apparatus 100 may further have a network printer mode.

As illustrated in FIG. 2, the image forming apparatus 100 mainly includes the original reading unit 110, an image forming unit 104, a paper feeding unit 106, a paper discharge processing device 108, the operation unit 120, and the like.

The operation unit 120 is constituted by the touch panel display 130 and a display operation unit 140. The touch panel display 130 is constituted by a display panel 132 configured by a liquid crystal panel and the like and a touch panel 134.

In the touch panel display 130, a home screen in which an operation mode in the image forming apparatus 100 is selected, a current state of the image forming apparatus 100, a destination designation status, a processing status of a job, and the like are displayed on the display panel 132.

In a preview display region of the display panel 132, a selection button which is a software button is displayed. When a region in which the selection button is displayed is pressed by a finger, the touch panel 134 detects a position which is pressed. A position in which the selection button is displayed and the position in which the touch panel 134 is pressed are compared on a program, and thereby operation mode selection, function setting, an operation instruction, or the like of the image forming apparatus 100 is performed. In addition to such a touch operation, the image forming apparatus 100 may also cope with a gesture operation.

The display operation unit 140 is constituted by an indicator lamp 142, a power key 144, an energy saving key 146, and a home key 148 by which a display screen of the touch panel display 130 is returned to the home screen in which an operation mode is selected.

In this manner, the image forming apparatus 100 includes the touch panel display 130 as a main operation device, and also includes the display operation unit 140 constituted by hardware keys and the indicator lamp. The keys of the display operation unit 140 are configured as hardware buttons, while software buttons are configured by the touch panel display 130.

Note that, the image forming apparatus 100 may not be limited to one that includes the display operation unit 140 having such a configuration, and may be one that includes only the touch panel display 130, as long as, when a user selects an operation mode in the home screen displayed on the touch panel display 130, the home screen is switched to an initial screen of the selected operation mode.

In the storage unit 150, image data of an original that is scanned by the image forming apparatus 100 is stored. Moreover, a program, data, or the like each of which is used to control an operation of the image forming apparatus 100 is stored in the storage unit 150.

The control unit 180 controls the image forming apparatus 100 in accordance with the program and the data which are stored in the storage unit 150, and also executes control related to each function of the image forming apparatus 100.

Next, a characteristic configuration of the image forming apparatus 100 according to the first embodiment will be described with reference to the drawings.

As illustrated in FIG. 1, the image forming apparatus 100 according to the first embodiment is characterized in that, in addition to the above-described components of the original reading unit 110, the storage unit 150, the image generation unit 160, the image output unit 170, the operation unit 120, and the control unit 180, a color change region specifying unit 190 that specifies, in a preview image, a region a color of which is changed is further included and color change of the region which is specified by the color change region specifying unit 190 in the preview image displayed on the touch panel display 130 is performed.

The color change region specifying unit 190 specifies, in the preview image displayed on the touch panel display 130, a region, a color of which is changed.

The first embodiment is characterized in that the control unit 180 performs control so that color change of the specified region in the preview image, which is specified by the color change region specifying unit 190, is performed.
(Layout Configuration of Touch Panel Display)

Next, the touch panel display 130 provided in the operation unit 120 will be described with reference to the drawings.

In the initial screen of the touch panel display 130, basic layout is divided into five regions (a "system region", a "function setting region", a "preview region", an "action panel region", and a "task trigger region") to be appropriately arranged.

As illustrated in FIG. 3, in basic layout of an operation screen 1301 serving as the initial screen, a system region 1000 is arranged in a top part, and a preview region 3000 (preview display region) is arranged in a center part of the screen. A function setting/checking region 2000 (hereinafter, described as a function setting region 2000) is arranged in the left of the preview region 3000. Moreover, an action panel region 4000 is arranged at the upper right of the preview region 3000, and a task trigger region (operation region) 5000 is arranged under the action panel region 4000.

Note that, the number of regions in the operation screen 1301 is not limited to five. The arrangement in a right-and-left direction is not limited thereto, either, and the arrangement of the regions in the right-and-left direction may be inverted in accordance with, for example, a dominant hand of a user. In addition, a position of the system region 1000 may be in a bottom part. Moreover, the system region 1000 may not be displayed depending on a state or setting.

Specifically, as illustrated in FIG. 4, a current state of the image forming apparatus 100 is displayed in the system region 1000, a title of an operation mode in which the image forming apparatus 100 is being operated and a status and a state of the image forming apparatus 100 are displayed. For example, an icon of the operation mode, the state of the apparatus, and the like are displayed in the system region 1000.

In the function setting region 2000, a function setting menu (an icon, a button, etc.) which is operated by a user for setting each function, switching display, or checking the setting is displayed.

In the initial screen, a virtual numeric keypad 3001 and a mimic display 3002 which illustrates the whole apparatus are displayed in the preview region 3000.

Moreover, the preview region 3000 is configured so that display is able to be performed with a size of a display region changed in accordance with an operation by the user.

In the action panel region 4000, information related to assistance, advice, or a proposition about the operation is displayed.

In the task trigger region 5000, trigger items which are operated by the user in order to actually operate the image forming apparatus 100 after all settings in the operation mode have been completed are displayed. An example thereof includes a start button (software button) by which processing is started.

As start buttons, a preview key 5102 with which an instruction to execute processing for preview display of a scanned image is given, a reset key 5104 with which an instruction to reset the instructed processing is given, a monochromatic start key 5106 with which an instruction to execute monochromatic copying is given, and a color start key 5108 with which an instruction to execute color copying is given are provided.

Positions where the five regions are arranged are not changed even when the operation mode is changed (in the initial screen of any operation mode). Moreover, each of the regions is configured such that a size thereof is able to be changed by being expanded or contracted in a lateral direction (longitudinal direction) of the screen of the touch panel display 130, similarly to switching display in the function setting region 2000 (and the preview region 3000).
(Operation of Color Change Processing)

Next, a case where color change by which a color in a specific region in an original image is changed is performed in the image forming apparatus 100 according to the first embodiment will be described with reference to the drawings.

In a case where a color in a specific region of an original image is changed, as illustrated in FIG. 4, a touch operation is performed for the preview key 5102 in the operation screen 1301 to thereby perform preview display of an image, which is input by the original reading unit 110, on the touch panel display 130.

When the preview key 5102 is subjected to the touch operation, as illustrated in FIG. 5, a color change operation screen 1302 is displayed. In the color change operation screen 1302, the function setting region 2000 is temporarily hidden in a screen side end part side and the preview region 3000 is enlarged. In a vicinity of a center part of the color change operation screen 1302, a preview image 1100 is displayed in the preview region 3000. A color change key 3100 is displayed in a lower end part of the preview region 3000.

Figure 6:
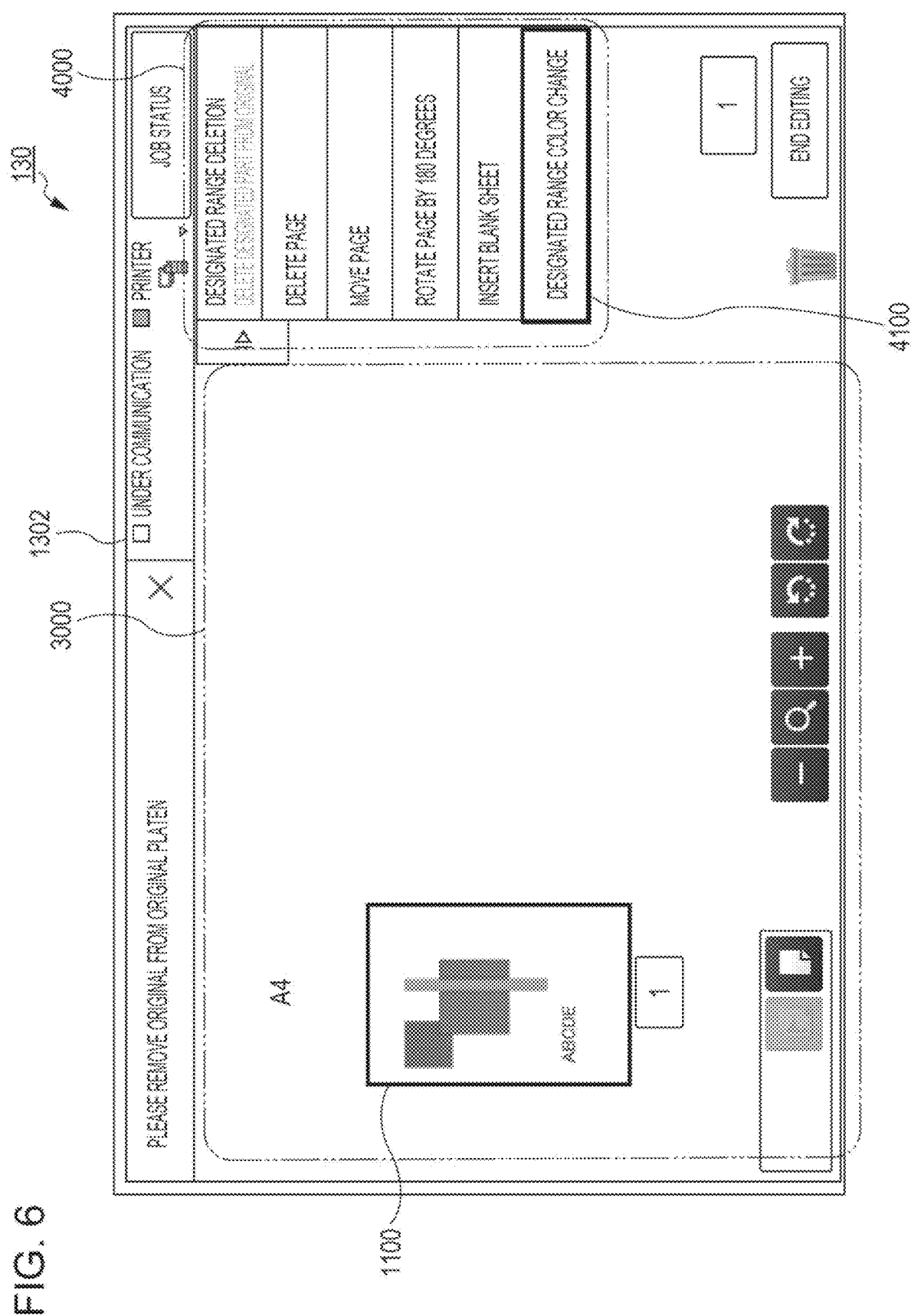
FIG. 6 is an explanatory view illustrating an example in which a function selection key is displayed in the color change operation screen.

When the color change key 3100 is subjected to a touch operation, as illustrated in FIG. 6, the preview image 1100 is displayed small on one side end side of the preview region 3000. A designated range color change key 4100 is displayed in the action panel region 4000 as a function selection key.

Figure 7:
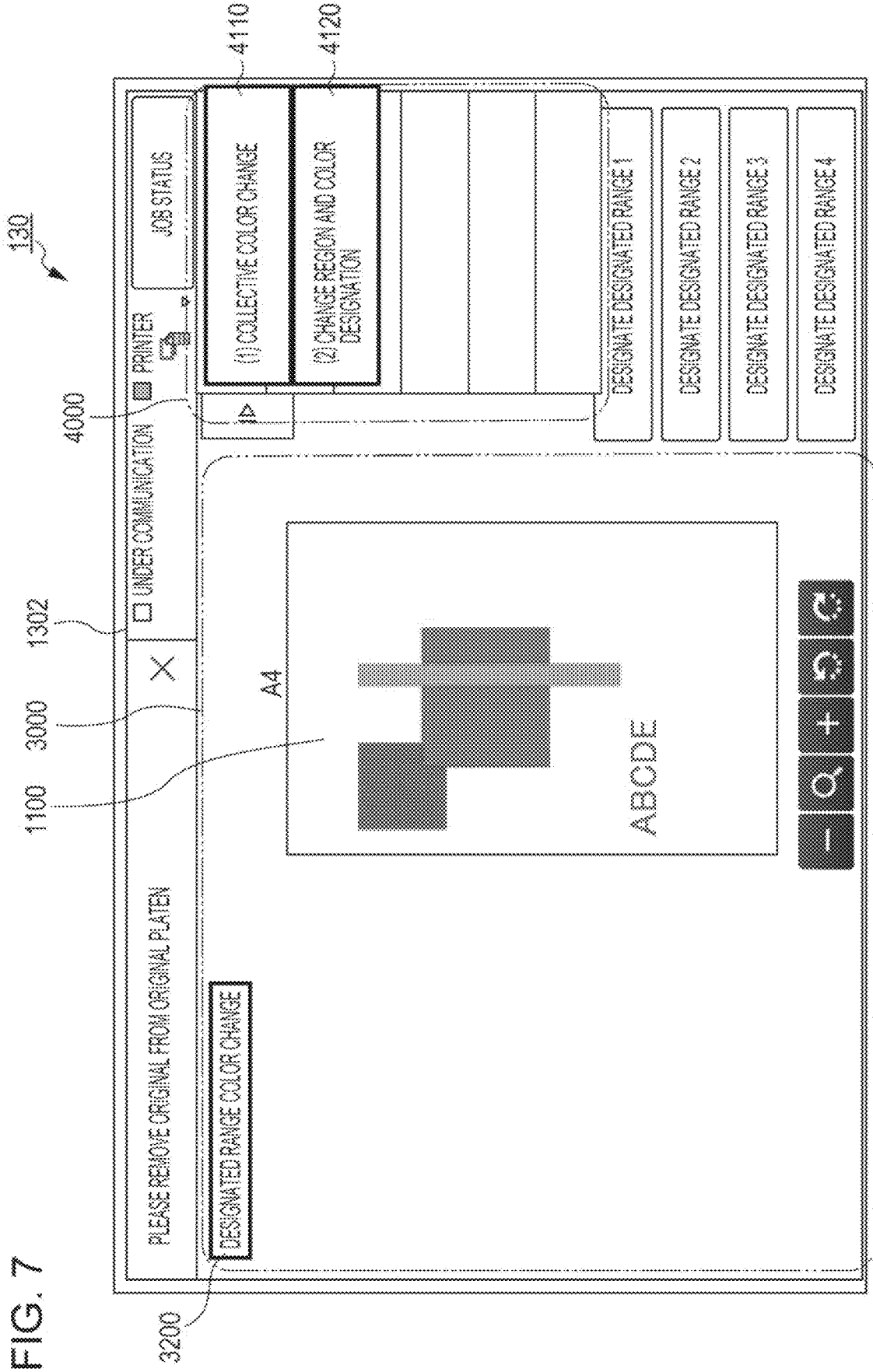
FIG. 7 is an explanatory view illustrating an example of a next screen after the function selection key is selected in the color change operation screen.

When the designated range color change key 4100 is subjected to a touch operation, as illustrated in FIG. 7, a setting instruction display part 3200 is displayed in one side end part of the preview region 3000. In the action panel region 4000, a collective color change key 4110 and a change region and color designation key 4120 are displayed as function selection keys.

In the setting instruction display part 3200, a content of the function selection key that is selected in the action panel region 4000 of FIG. 6 is displayed. In this case, the designated range color change key 4100 is selected by the touch operation, so that "designated range color change" is displayed in the setting instruction display part 3200.

Figure 8:
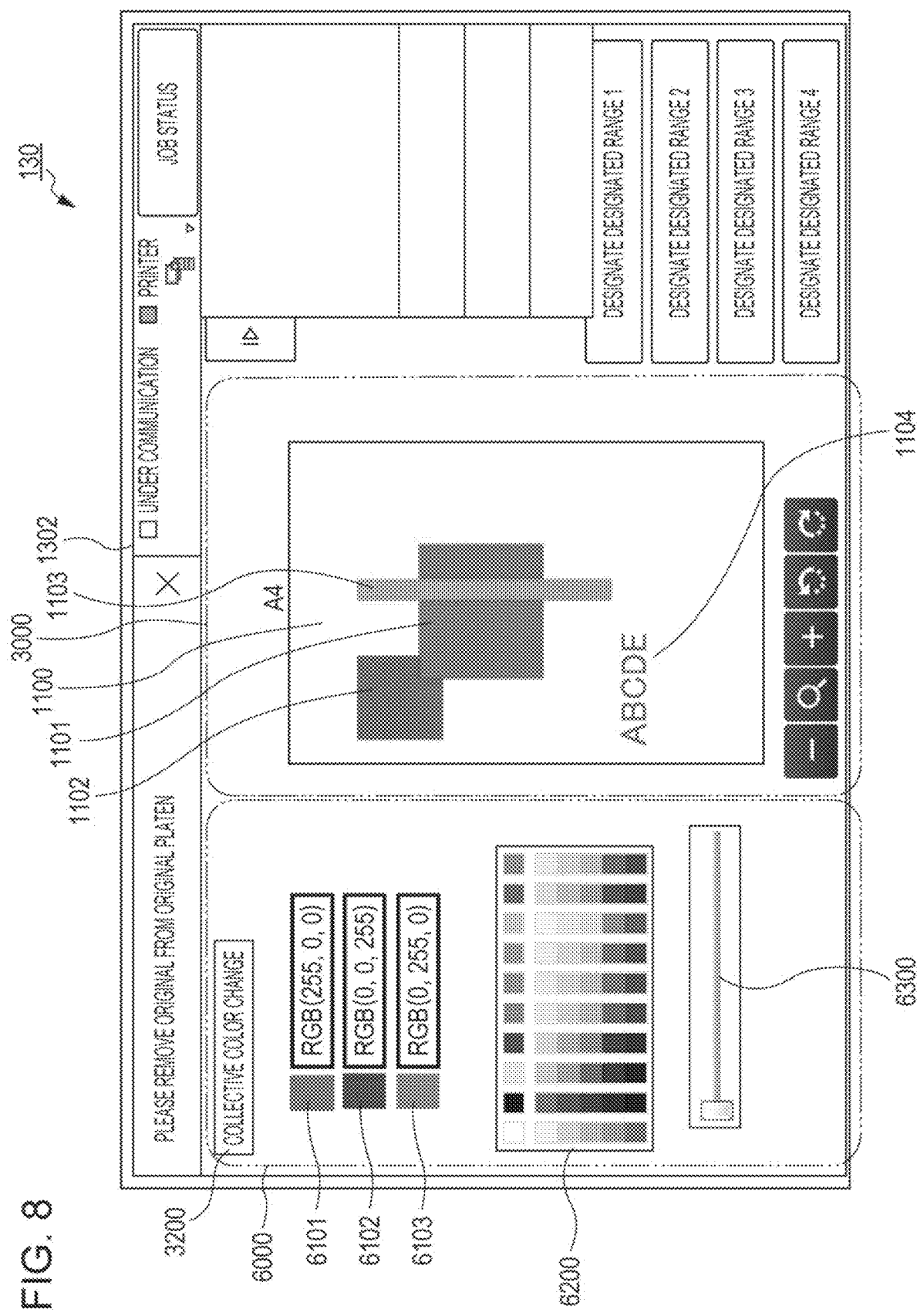
FIG. 8 is an explanatory view illustrating an example of a screen in which a color designation region is displayed in the color change operation screen.

When the collective color change key 4110 is selected by a touch operation, as illustrated in FIG. 8, "collective color change" is displayed in the setting instruction display part 3200. The preview region 3000 becomes a region in a vicinity of a center part of the operation screen 1301, and a color designation region 6000 is formed on one side end part side of the operation screen 1301.

In the color designation region 6000, a first color designation part 6101, a second color designation part 6102, a third color designation part 6103, a palette 6200, and a slide bar 6300 are displayed.

In the preview region 3000, the preview image 1100 is displayed. In the preview image 1100, a first change region 1101, a second change region 1102, a third change region 1103, and a fourth change region 1104 for each of which color change is performed are specified.

In the first embodiment, setting is performed so that colors of the first change region 1101 and the fourth change region 1104 are changed into a color designated in the first color designation part 6101, a color of the second change region 1102 is changed into a color designated in the second color designation part 6102, and a color of the third change region 1103 is changed into a color designate in the third color designation part 6103.

Note that, a change region in the preview image 1100, for which color change is performed, may be specified automatically in accordance with an area of the region for which color change is performed, or a user may selectively specify the change region.

Figure 9:
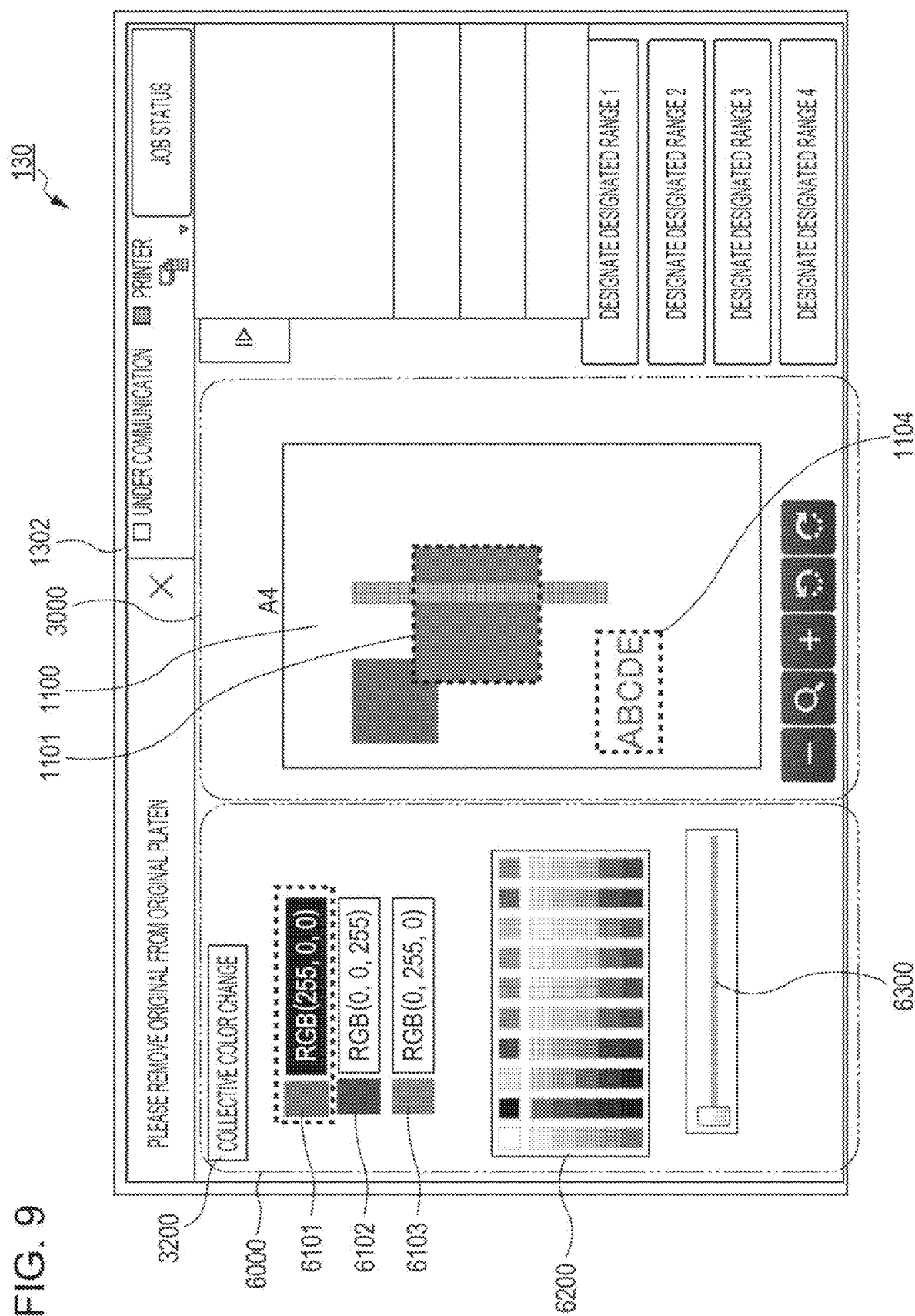
FIG. 9 is an explanatory view illustrating an example of a screen in a state where, for a color change region, a color is designated in the color change operation screen.

Moreover, in the first embodiment, for example, when a color is designated in the first color designation part 6101 for the first change region 1101 and the fourth change region 1104, the designated color and the region for which color change has been performed are highlighted so as to be visually distinct, as illustrated in FIG. 9.

Highlighting may be performed, for example, by temporarily displaying an outline at places of the change region and the designated color as illustrated in FIG. 9, or by performing flashing display for the places of the change region and the designated color.

In this manner, in a case where color change is performed for an image which is input, by performing preview display of the image to specify a region for which the color change is performed and to designate a color into which the change is performed, it is possible to easily perform the color change of the image and check, in a preview image, an image after the color change.

(Operation Processing of Color Change)

Next, color change processing in the image forming apparatus 100 of the first embodiment, in which color change is performed for an image which is input, will be described with reference to a flowchart.

Figure 10:
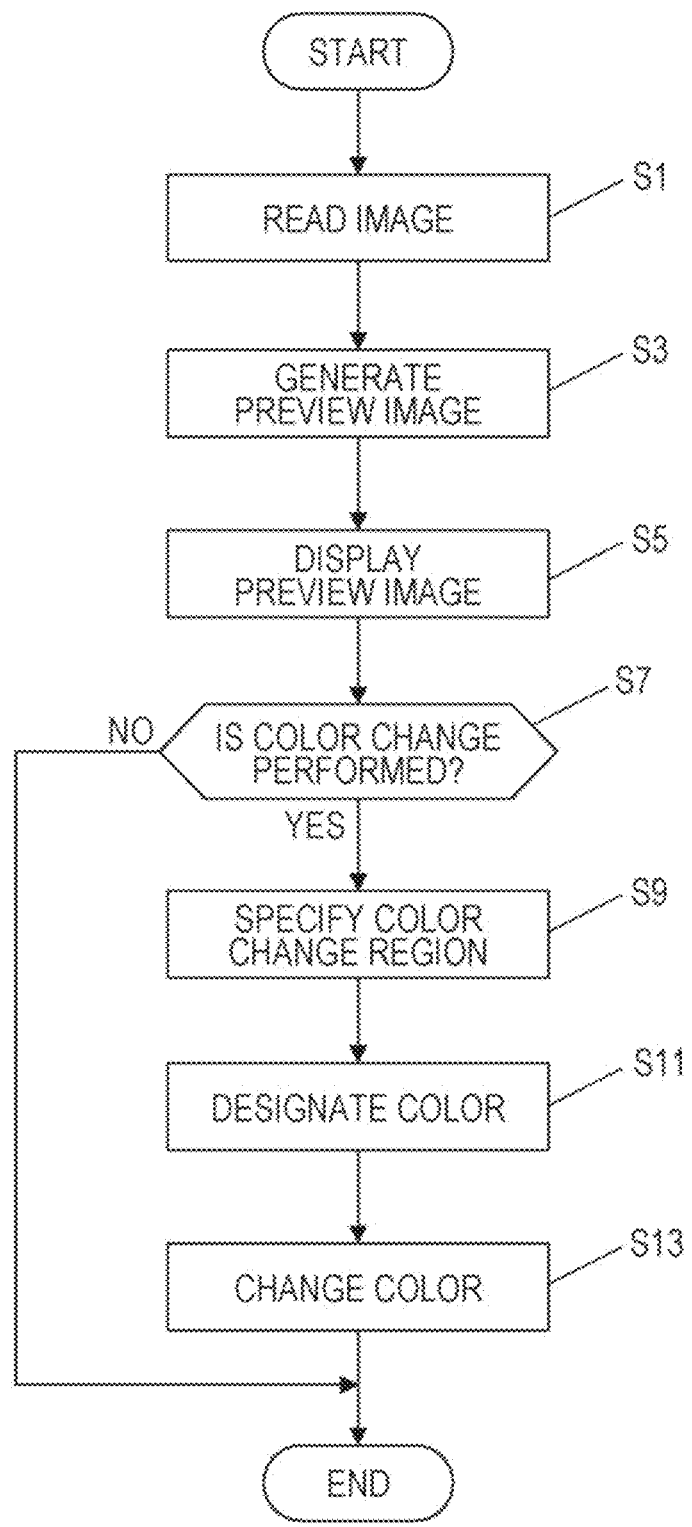
FIG. 10 is a flowchart illustrating a process of color change processing in the image forming apparatus according to the first embodiment, in which color change is performed for an image which is input.

FIG. 10 is a flowchart illustrating a process of the color change processing in the image forming apparatus of the first embodiment, in which color change is performed for an image which is input.

In a case where color change is performed for the input image in the image forming apparatus 100 of the first embodiment, first, an image is read from an original as illustrated in FIG. 10 (step S1). Image data obtained by reading is stored in the storage unit 150.

Then, a preview image is generated based on the image data (step S3), and the generated preview image is displayed in the preview region 3000 of the touch panel display 130 (step S5).

Thereafter, whether or not color change of the image is performed is determined (selected) (step S7).

In a case where, at step S7, it is determined that color change of the image is not performed, the color change processing ends. On the other hand, in a case where, at step S7, it is determined that color change of the image is performed, a region in the preview image, for which the color change is performed, is specified (step S9).

A color into which the change is performed is designated (step S11), and a color of the region for which the color change is performed is changed into the designated color (step S13). In this manner, the color change processing of the image is executed.

Since the configuration is provided as above, according to the first embodiment, by providing the image forming apparatus 100 with the original reading unit 110, the image generation unit 160, the image output unit 170, the touch panel display 130, the color change region specifying unit 190, and the control unit 180 that performs control so that color change is performed for a region specified by the color change region specifying unit 190, it is possible to easily change a color of the region specified in a state where preview display of an image based on image data is performed into a color which is desired by a user, thus making it possible to achieve the image forming apparatus 100 that has an excellent user interface.

Moreover, in the first embodiment, as illustrated in FIG. 9, when a color into which change is performed is designated in the first color designation part 6101 for the first change region 1101 and the fourth change region 1104, the designated color and the regions for which color change has been performed are highlighted in the preview image 1100 so as to be visually distinct, so that it is possible to immediately check places for which the color change is to be performed. At this time, by moving the slide bar 6300 in a right-and-left direction, it is possible to control a color difference range from the designated color.

Figure 11:
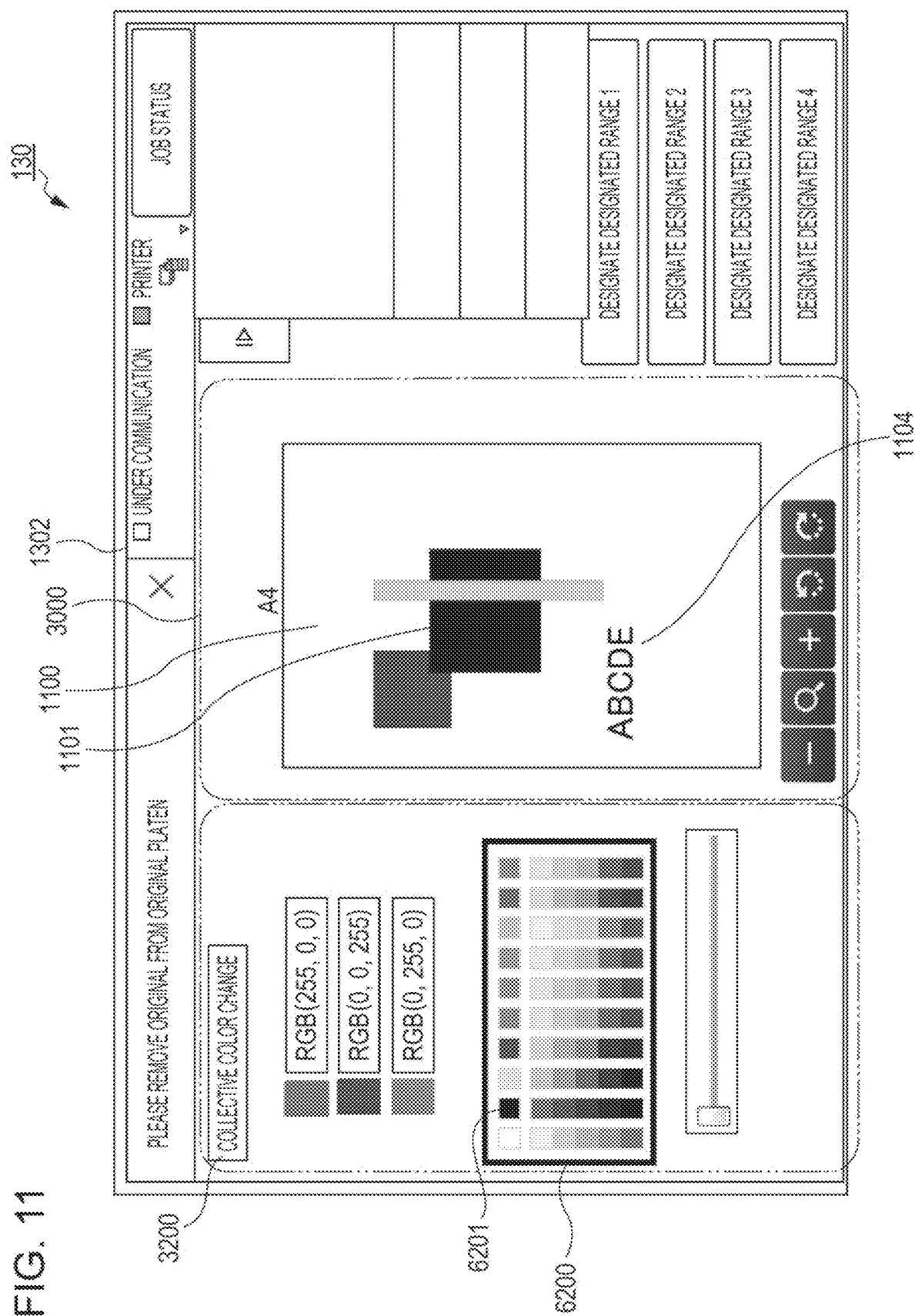
FIG. 11 is an explanatory view illustrating an example in which color designation is performed in the color change operation screen.

Note that, in the first embodiment, when a color into which change is performed is designated, the color is designated in the first color designation part 6101, the second color designation part 6102, or the third color designation part 6103, but, as another example, as illustrated in FIG. 11, by designating a desired color 6201 from the palette 6200 in which a plurality of colors are displayed, a color of a specified region, for example, the first change region 1101 and the fourth change region 1104 may be collectively changed into the designated color.

Figure 12:
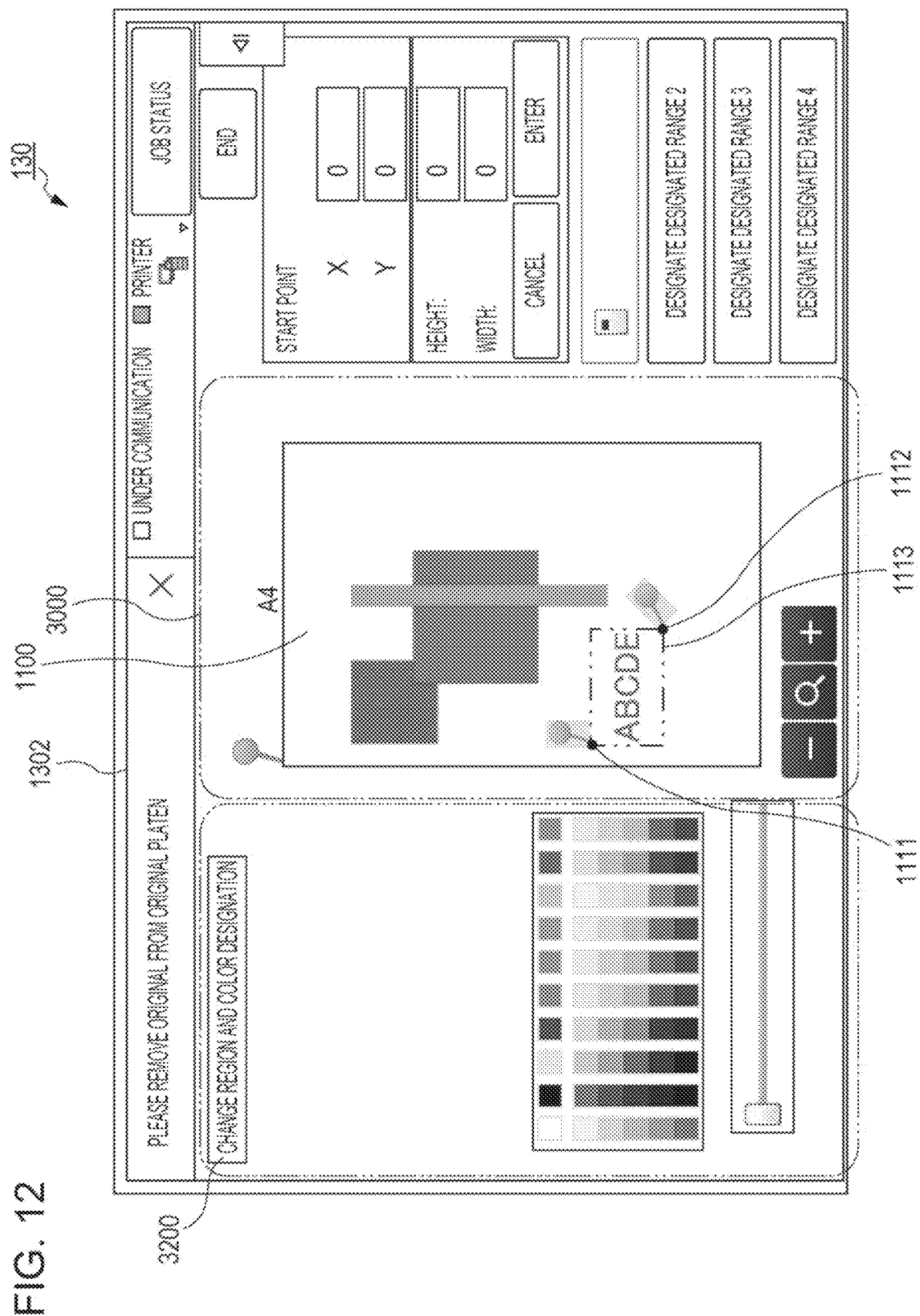
FIG. 12 is an explanatory view illustrating an example in which the color change region is specified in the color change operation screen.

Moreover, although the first change region 1101, the second change region 1102, the third change region 1103, and the fourth change region 1104 are specified in the preview image 1100 as regions, colors of which are changed, in the first embodiment, as another example, as illustrated in FIG. 12, in order to specify a region for which color change is performed, a start point position 1111 and an end point position 1112 by which a region in a rectangular shape is formed on the preview image 1100 may be set to thereby form a change region 1113 which is in a rectangular shape.

Figure 13:
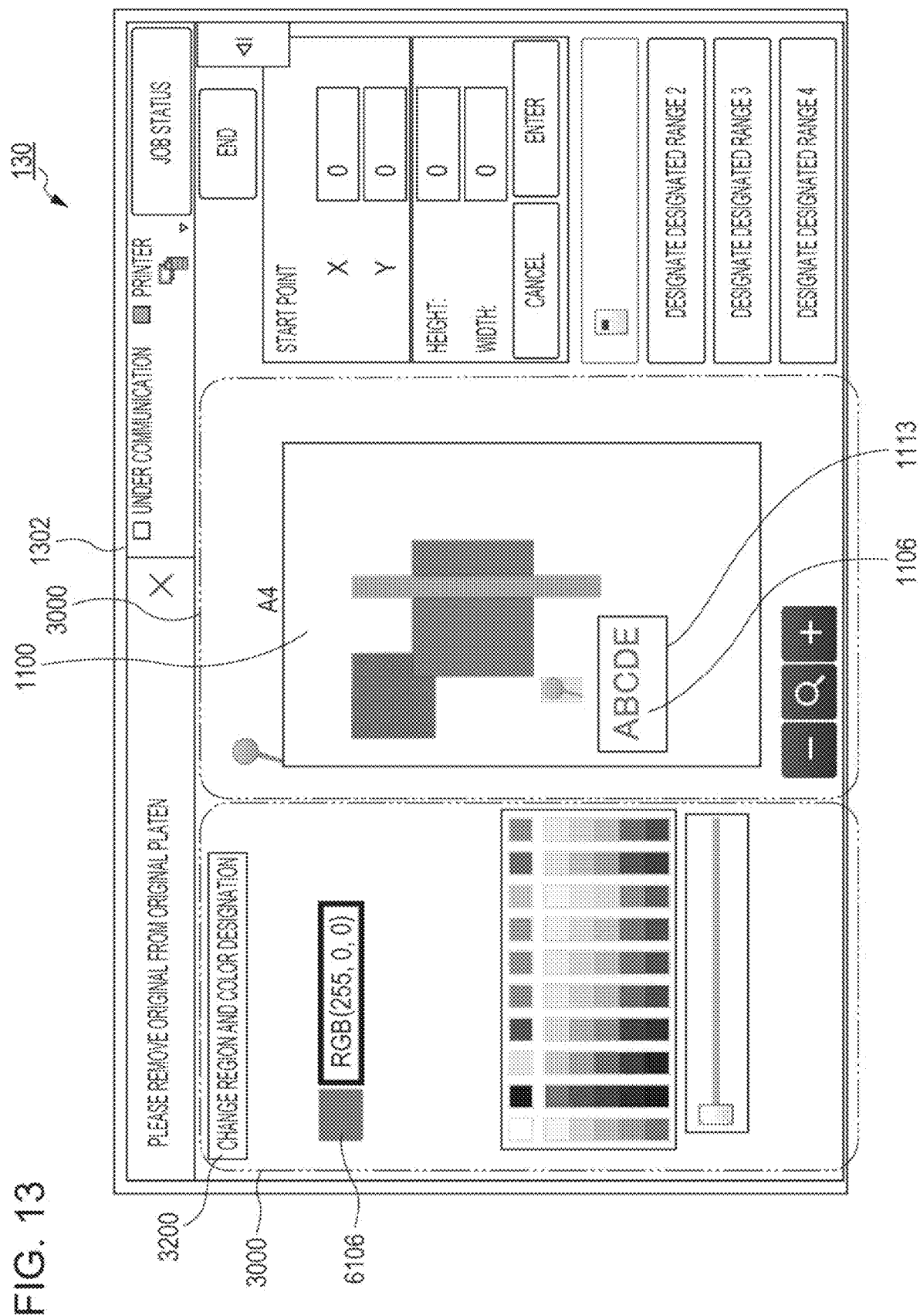
FIG. 13 is an explanatory view illustrating an example in which the color change region is specified in the color change operation screen.

Thereafter, as illustrated in FIG. 13, by specifying a character row 1106 of "ABCDE" in the change region 1113, the character row 1106 may be specified as a place for which the color change is performed.

Figure 14:
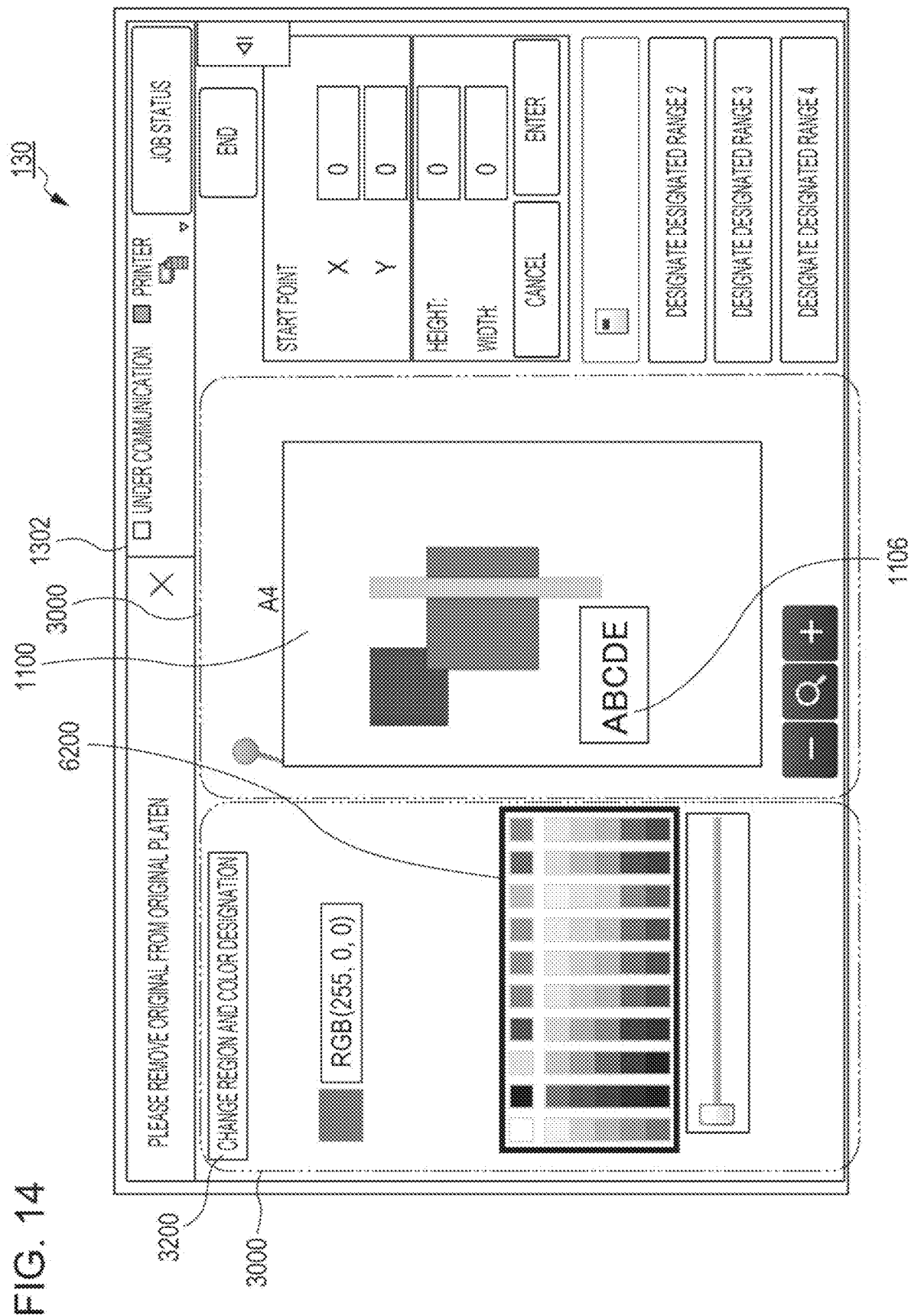
FIG. 14 is an explanatory view illustrating an example in which the color change region is specified and a color is designated in the color change operation screen.

Then, as illustrated in FIG. 14, a color into which a color of the character row 1106 is changed may be designated from the palette 6200.

Second Embodiment

Next, a second embodiment of the disclosure will be described.

The second embodiment is characterized in that, when color change is performed for an image, which is input, in the image forming apparatus 100, the color change is performed by distinguishing between an image region and a character region in a preview image displayed on the touch panel display 130.

Hereinafter, color change processing in the image forming apparatus 100 of the second embodiment, in which color change is performed for an image which is input, will be described with reference to a flowchart.

Figure 15:
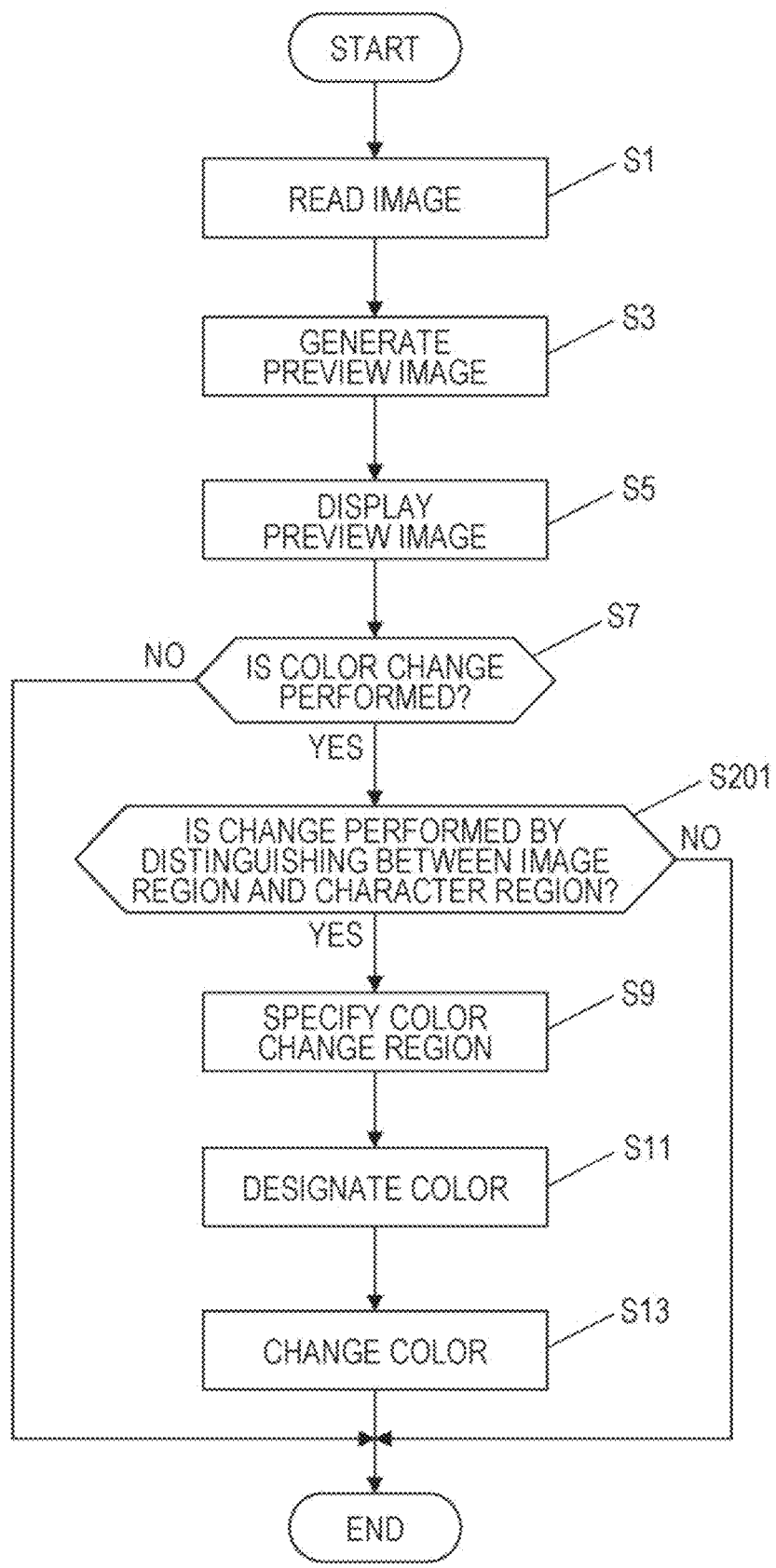
FIG. 15 is a flowchart illustrating a process of color change processing in an image forming apparatus according to a second embodiment, in which color change is performed for an image which is input.

FIG. 15 is a flowchart illustrating a process of the color change processing in the image forming apparatus of the second embodiment, in which color change is performed for an image which is input.

Note that, since a configuration of the image forming apparatus according to the second embodiment is similar to that of the image forming apparatus of the first embodiment, description thereof will be omitted.

The processing of the second embodiment is similar to the processing of the first embodiment, except for a process in which, when color change is performed for an image, which is input, in the image forming apparatus 100, the color change is performed by distinguishing between an image region and a character region in a preview image. Therefore, description for step S1 to step S13 will be omitted in the flowchart illustrated in FIG. 15.

In the second embodiment, as illustrated in FIG. 15, when color change is performed for an image, which is input, in the image forming apparatus 100 (step S1 to step S7), whether or not the color change is performed by distinguishing between an image region and a character region in the preview image is determined (selected) (step S201).

In a case where, at step S201, it is determined that the color change is not performed by distinguishing between an image region and a character region, the color change processing ends. On the other hand, in a case where, at step S201, it is determined that the color change is performed by distinguishing between an image region and a character region, the color change processing of the image is executed along step S9 to step S13 by distinguishing between an image region and a character region.

Since the configuration is provided as above, according to the second embodiment, the image forming apparatus 100 is provided with the original reading unit 110, the image generation unit 160, the image output unit 170, the touch panel display 130, the color change region specifying unit 190, and the control unit 180 that performs control so that color change is performed for a region specified by the color change region specifying unit 190, and color change is performed by dividing a region, for which the color change is performed, into an image region and a character region, and thereby making distinction as to a region for which color change is performed is facilitated, thus making it possible to easily change a color of the region into a color desired by a user.

Third Embodiment

Next, a third embodiment of the disclosure will be described.

The third embodiment is characterized in that, when color change is performed for an image, which is input, in the image forming apparatus 100, the color change is performed by specifying, in a preview image displayed on the touch panel display 130 by OCR (Optical Character Recognition), a character region as a region, for which the color change is performed.

Hereinafter, color change processing in the image forming apparatus 100 of the third embodiment, in which color change is performed for an image which is input, will be described with reference to a flowchart.

Figure 16:
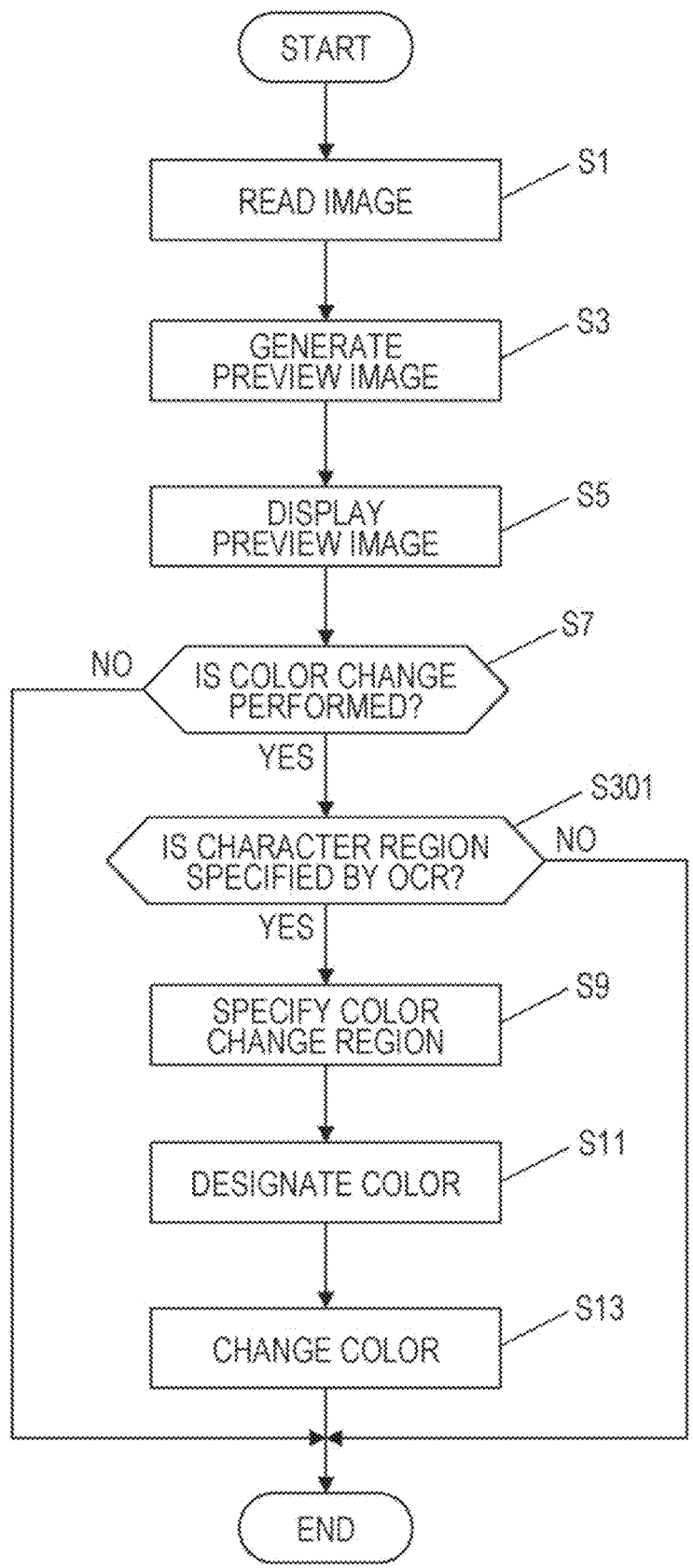
FIG. 16 is a flowchart illustrating a process of color change processing in an image forming apparatus according to a third embodiment, in which color change is performed for an image which is input.

FIG. 16 is a flowchart illustrating a process of the color change processing in the image forming apparatus of the third embodiment, in which color change is performed for an image which is input.

Note that, since a configuration of the image forming apparatus according to the third embodiment is similar to that of the image forming apparatus of the first embodiment, description thereof will be omitted.

The processing of the third embodiment is similar to the processing of the first embodiment, except for a process in which, when color change is performed for an image, which is input, in the image forming apparatus 100, a character region is specified in a preview image by OCR as a region, for which the color change is performed. Therefore, description for step S1 to step S13 will be omitted in the flowchart illustrated in FIG. 16.

In the third embodiment, as illustrated in FIG. 16, when color change is performed for an image, which is input, in the image forming apparatus 100 (step S1 to step S7), whether or not the color change is performed by specifying a character region in the preview image by OCR is determined (selected) (step S301).

In a case where, at step S301, it is determined that the color change is not performed by specifying a character region by OCR, the color change processing ends. On the other hand, in a case where, at step S301, it is determined that the color change is performed by specifying a character region by OCR, the color change processing of the image is executed along step S9 to step S13 by specifying a character region by OCR.

Since the configuration is provided as above, according to the third embodiment, the image forming apparatus 100 is provided with the original reading unit 110, the image generation unit 160, the image output unit 170, the touch panel display 130, the color change region specifying unit 190, and the control unit 180 that performs control so that color change is performed for a region specified by the color change region specifying unit 190, and color change is performed by specifying a character region as a region, for which the color change is performed, by OCR, and it is thereby possible to make the character region, for which the color change is performed, clear, thus making it possible to easily change a color of the character region into a color desired by a user.

Fourth Embodiment

Next, a fourth embodiment of the disclosure will be described.

The fourth embodiment is characterized in that, when color change is performed for an image, which is input, in the image forming apparatus 100, the color change is performed by recognizing a character pattern and a graphic pattern and specifying, in a preview image displayed on the touch panel display 130, a specific character pattern and a specific graphic pattern as regions for which the color change is performed.

Hereinafter, color change processing in the image forming apparatus 100 of the fourth embodiment, in which color change is performed for an image which is input, will be described with reference to a flowchart.

Figure 17:
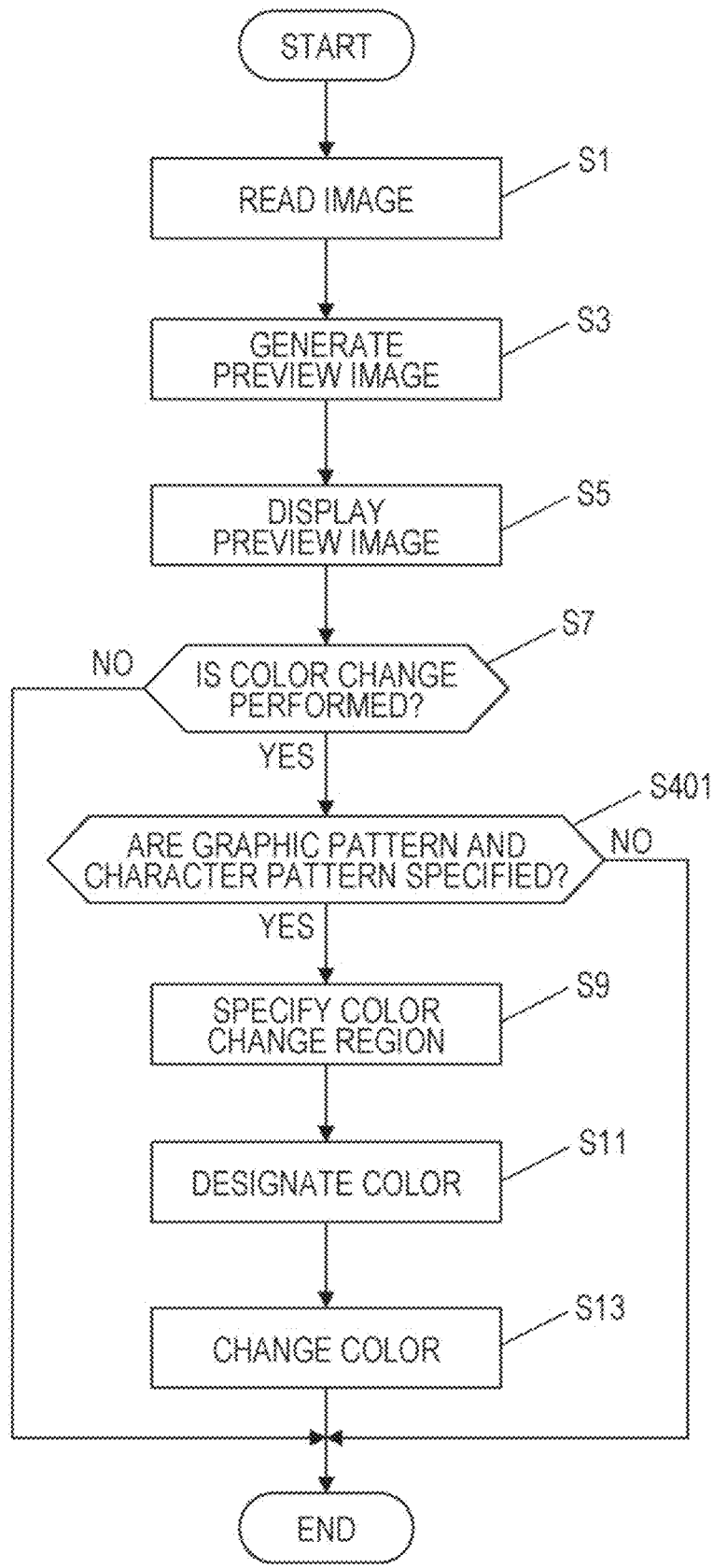
FIG. 17 is a flowchart illustrating a process of color change processing in an image forming apparatus according to a fourth embodiment, in which color change is performed for an image which is input.

FIG. 17 is a flowchart illustrating a process of the color change processing in the image forming apparatus of the fourth embodiment, in which color change is performed for an image which is input.

Note that, since a configuration of the image forming apparatus according to the fourth embodiment is similar to that of the image forming apparatus of the first embodiment, description thereof will be omitted.

The processing of the fourth embodiment is similar to the processing of the first embodiment, except for a process in which, when color change is performed for an image, which is input, in the image forming apparatus 100, a specific character pattern and a specific graphic pattern are specified in a preview image as regions, for which the color change is performed. Therefore, description for step S1 to step S13 will be omitted in the flowchart illustrated in FIG. 17.

In the fourth embodiment, as illustrated in FIG. 17, when color change is performed for an image, which is input, in the image forming apparatus 100 (step S1 to step S7), whether or not the color change is performed by specifying, in the preview image, a specific character pattern and a specific graphic pattern as regions, for which the color change is performed is determined (selected) (step S401).

In a case where, at step S401, it is determined that the color change is not performed by specifying a specific character pattern and a specific graphic pattern as regions for which the color change is performed, the color change processing ends. On the other hand, in a case where, at step S401, it is determined that the color change is performed by specifying a specific character pattern and a specific graphic pattern as regions for which the color change is performed, the color change processing of the image is executed along step S9 to step S13 by specifying a specific character pattern and a specific graphic pattern as regions for which the color change is performed.

Since the configuration is provided as above, according to the fourth embodiment, the image forming apparatus 100 is provided with the original reading unit 110, the image generation unit 160, the image output unit 170, the touch panel display 130, the color change region specifying unit 190, and the control unit 180 that performs control so that color change is performed for a region specified by the color change region specifying unit 190, and color change is performed by specifying a specific character pattern and a specific graphic pattern as regions for which the color change is performed, and it is thereby possible to make the character pattern and the graphic pattern, for which the color change is performed, clear, thus making it possible to easily change colors of the character pattern and the graphic pattern into a color desired by a user.

Fifth Embodiment

Next, a fifth embodiment of the disclosure will be described.

The fifth embodiment is characterized in that, when color change is performed for an image, which is input, in the image forming apparatus 100 and there are a plurality of pages of images which are input, the color change of a region specified in a preview image displayed on the touch panel display 130 is reflected to all of the pages.

Hereinafter, color change processing in the image forming apparatus 100 of the fifth embodiment, in which color change is performed for an image which is input, will be described with reference to a flowchart.

FIG. 18 is a flowchart illustrating a process of the color change processing in the image forming apparatus of the fifth embodiment, in which color change is performed for an image which is input.

Note that, since a configuration of the image forming apparatus according to the fifth embodiment is similar to that of the image forming apparatus of the first embodiment, description thereof will be omitted.

The processing of the fifth embodiment is similar to the processing of the first embodiment, except for a process in which, when color change is performed for an image, which is input, in the image forming apparatus 100, processing in which the color change is performed is reflected to all pages. Therefore, description for step S1 to step S13 will be omitted in the flowchart illustrated in FIG. 18.

In the fifth embodiment, as illustrated in FIG. 18, after processing in which a color of a region specified in a preview image is changed into a designated color in the image forming apparatus 100 is performed along step S1 to step S13, whether or not the color change processing is reflected to all pages is determined (selected) (step S501).

In a case where, at step S501, it is determined that the color change processing is not reflected to all pages, the color change processing ends. On the other hand, in a case where, at step S501, it is determined that the color change processing is reflected to all pages, the color change processing is executed for all pages by specifying a region, for which the color change is performed, for each page (step S503).

Since the configuration is provided as above, according to the fifth embodiment, the image forming apparatus 100 is provided with the original reading unit 110, the image generation unit 160, the image output unit 170, the touch panel display 130, the color change region specifying unit 190, and the control unit 180 that performs control so that color change is performed for a region specified by the color change region specifying unit 190, and color change of a region specified in a preview image is reflected to all pages, and it is thereby possible to easily perform change without performing color change of an image for each page.

Note that, although the color change processing performed for an image which is input is reflected to all pages in the fifth embodiment, the color change processing may be reflected selectively to a specific page.

As above, the disclosure is not limited to the embodiments described above, and may be modified in various manners within the scope indicated in the claims. It is apparent that a person skilled in the art can think of various changes and modifications in the category described in claims, that is, an embodiment achieved by combining techniques appropriately changed without departing from the spirit of the disclosure is also encompassed in the technical scope of the disclosure.

The present disclosure contains subject matter related to that disclosed in Japanese Priority Patent Application JP 2018-155403 filed in the Japan Patent Office on Aug. 22, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus comprising:
a display unit;
an input circuitry that inputs image data;
an image generation circuitry that generates an image based on the image data;
a preview image generation circuitry that generates a preview image based on the image data; and
a control circuitry,
wherein the control circuitry is configured to:

display, on the display unit, a first display screen in which the preview image, a task trigger key to start task execution, and a color change key are displayed;

display, on the display unit, a second display screen in which the preview image and a button for designating a color are displayed without displaying the task trigger key when the color change key is selected;

display the preview image in a first region of the second display screen;

display the button for designating a color in a second region of the second display screen, the second region being different from the first region;

specify, in the preview image, a region where a color is to be changed; and change the color of the specified region into the color that is designated by the button for designating a color.

2. The image forming apparatus according to claim 1, wherein the control circuitry specifies a region in the preview image, an area of which is equal to or more than a predetermined area, as a region where a color is to be changed.

3. The image forming apparatus according to claim 1, wherein the control circuitry specifies a region, which is selectively specified by a user, as a color change region where a color is to be changed.

4. The image forming apparatus according to claim 1, wherein the control circuitry specifies, in the preview image, a region where a color is to be changed by making distinction between an image region and a character region.

5. The image forming apparatus according to claim 1, wherein the control circuitry specifies, in the preview image, a region where a color is to be changed by making distinction as to a specific character pattern and a specific graphic pattern.

6. The image forming apparatus according to claim 1, wherein in a case where the image data input by the input circuitry is data of a plurality of pages, a region, where a color is to be changed, specified by the control circuitry is reflected to all of the pages or selectively to a specific page.

7. An image color change method comprising:

inputting image data;

generating an image based on the image data;

generating a preview image based on the image data;

displaying a first display screen in which the preview image, a task trigger key to start task execution, and a color change key are displayed, displaying a second display screen in which the preview image and a button for designating a color are displayed without displaying the task trigger key when the color change key is selected, displaying the preview image in a first region of the second display screen;

displaying the button for designating a color in a second region of the second display screen, the second region being different from the first region;

specifying, in the preview image, a region where a color is to be changed; and changing the color of the specified region into the color that is designated by the button for designating a color.

8. The image forming apparatus according to claim 1, wherein the control circuitry displays a button for selecting the specified region in a third region of the second display screen, the third region is different from the first region and the second region, and the control circuitry changes the color of the specified region, which is selected by the button for selecting the specified region, into the color that is designated by the button for designating a color.

9. The image forming apparatus according to claim 1, wherein the control circuitry specifies a character region using OCR (Optical Character Recognition) in the preview image, and the control circuitry does not change the color of the character region.

* * * * *